(12) United States Patent
Bromley et al.

(10) Patent No.: US 6,772,290 B1
(45) Date of Patent: Aug. 3, 2004

(54) SYSTEM AND METHOD FOR PROVIDING SAFE DATA MOVEMENT USING THIRD PARTY COPY TECHNIQUES

(75) Inventors: Graham Bromley, Dublin, CA (US); James P Ohr, St. Paul, MN (US)

(73) Assignee: Veritas Operating Corporation, Mountain View, CA (US)

( * ) Notice: Subject to any disclaimer, the term of this patent is extended or adjusted under 35 U.S.C. 154(b) by 143 days.

(21) Appl. No.: 10/224,044

(22) Filed: Aug. 20, 2002

Related U.S. Application Data (63) Continuation of application No. 09/924,228, filed on Aug. 7, 2001.

(51) Int. Cl.$^7$ ............................................. G06F 12/00
(52) U.S. Cl. ......................... 711/118; 711/126; 711/133; 711/162; 707/204
(58) Field of Search ................................ 711/118, 126, 711/133, 159, 162, 165; 707/203, 204, 205; 709/203, 217, 225; 710/36; 714/6

(56) References Cited

U.S. PATENT DOCUMENTS

| | | | | |
|---|---|---|---|---|
| 5,155,845 | A | 10/1992 | Beal et al. | 395/575 |
| 5,251,318 | A | 10/1993 | Nitta et al. | 395/725 |
| 5,506,980 | A | 4/1996 | Inagami et al. | 395/486 |
| 5,692,155 | A | 11/1997 | Iskiyan et al. | 395/489 |
| 5,832,515 | A | 11/1998 | Ledain et al. | 707/202 |
| 5,944,789 | A | 8/1999 | Tzelnic et al. | 709/214 |
| 6,108,749 | A | 8/2000 | White et al. | 711/112 |
| 6,173,377 | B1 | 1/2001 | Yanai et al. | 711/162 |
| 6,209,070 | B1 | 3/2001 | Reed et al. | 711/165 |
| RE37,601 | E | * 3/2002 | Eastridge et al. | 714/6 |
| 6,353,878 | B1 | * 3/2002 | Dunham | 711/162 |
| 6,363,385 | B1 | 3/2002 | Kedem et al. | 707/10 |
| 6,507,853 | B2 | 1/2003 | Bamford et al. | 707/203 |
| 6,549,992 | B1 | 4/2003 | Armangau et al. | 711/162 |

OTHER PUBLICATIONS

*Working Draft*, Project T10/1416–D, Information Technology—SCSI Primary Commands—3 (SPC–3), Revision 03, Reference No. ISO/IEC 14776–313: 200x, ANSI NCITS (American National Standards Institute, Inc.) ***:200x, Jan. 10, 2002, pp. iii–xxiv & 1–330.

* cited by examiner

*Primary Examiner*—Pierre M. Vital
(74) *Attorney, Agent, or Firm*—Campbell Stephenson Ascolese LLP; Marc R. Ascolese (57) ABSTRACT

Systems, methods, apparatus and software can utilize an indirect write driver to prevent possible error conditions associated with using a third-party copy operation directed at a storage resource. A data transport mechanism such as a data restore application initiates a third-party copy operation from a data source to a data cache. The indirect write driver monitors write commands as they pass to a storage resource driver. If a command is found to be an indirect write command, e.g., a command designed to complete the movement of data from the data cache to the storage resource, it is handled accordingly. Normal write commands are passed on to the storage resource driver. By completing the data move operation using normal storage management channels, e.g., the operating system, file system, and/or volume manager, error conditions can be avoided.

25 Claims, 6 Drawing Sheets

SYSTEM AND METHOD FOR PROVIDING SAFE DATA MOVEMENT USING THIRD PARTY COPY TECHNIQUES

This application is a continuation-in-part of U.S. application Ser. No. 09/924,228, filed Aug. 7, 2001, entitled "System and Method for Preventing Sector Slipping in a Storage Area Network" and naming James Ohr as the inventor. The above-referenced application is hereby incorporated by reference herein in its entirety.

FIELD OF THE INVENTION

The present invention relates to the field of data protection and more particularly to a system and method for using indirect writes to provide safe movement of data using third-party copy techniques.

BACKGROUND OF THE INVENTION

Recent developments in storage solutions have led to the increased utilization by enterprises of Storage Area Networks (SANs) to provide storage consolidation, reliability, availability, and flexibility. Factors driving these developments include the increase in the amount of on-line data, data protection requirements including efficient and reliable data back-up, and rapidly increasing disk bit densities.

Figure 1:
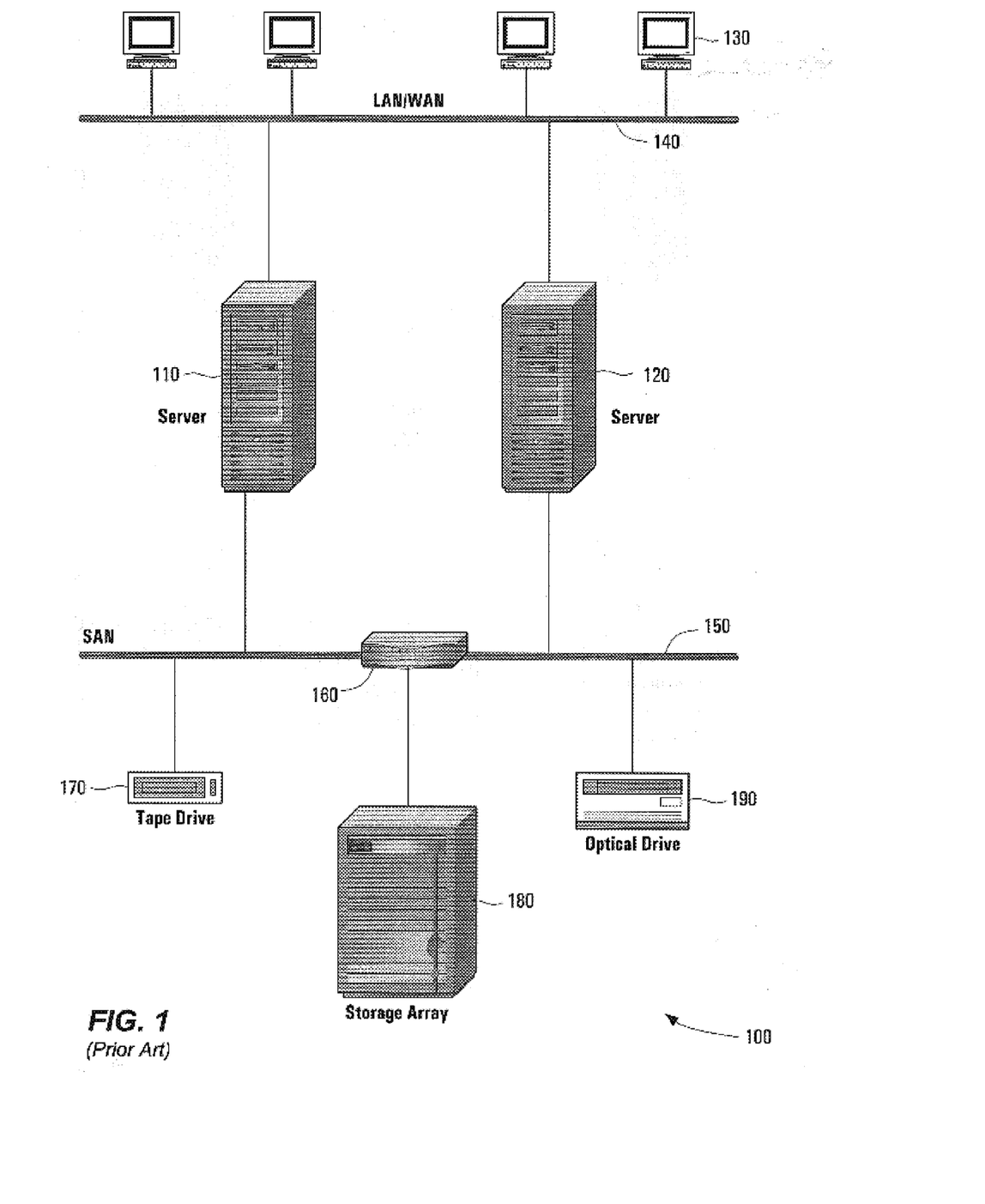
FIG. 1 simplified block diagram of an enterprise computer system.
Figure 6:
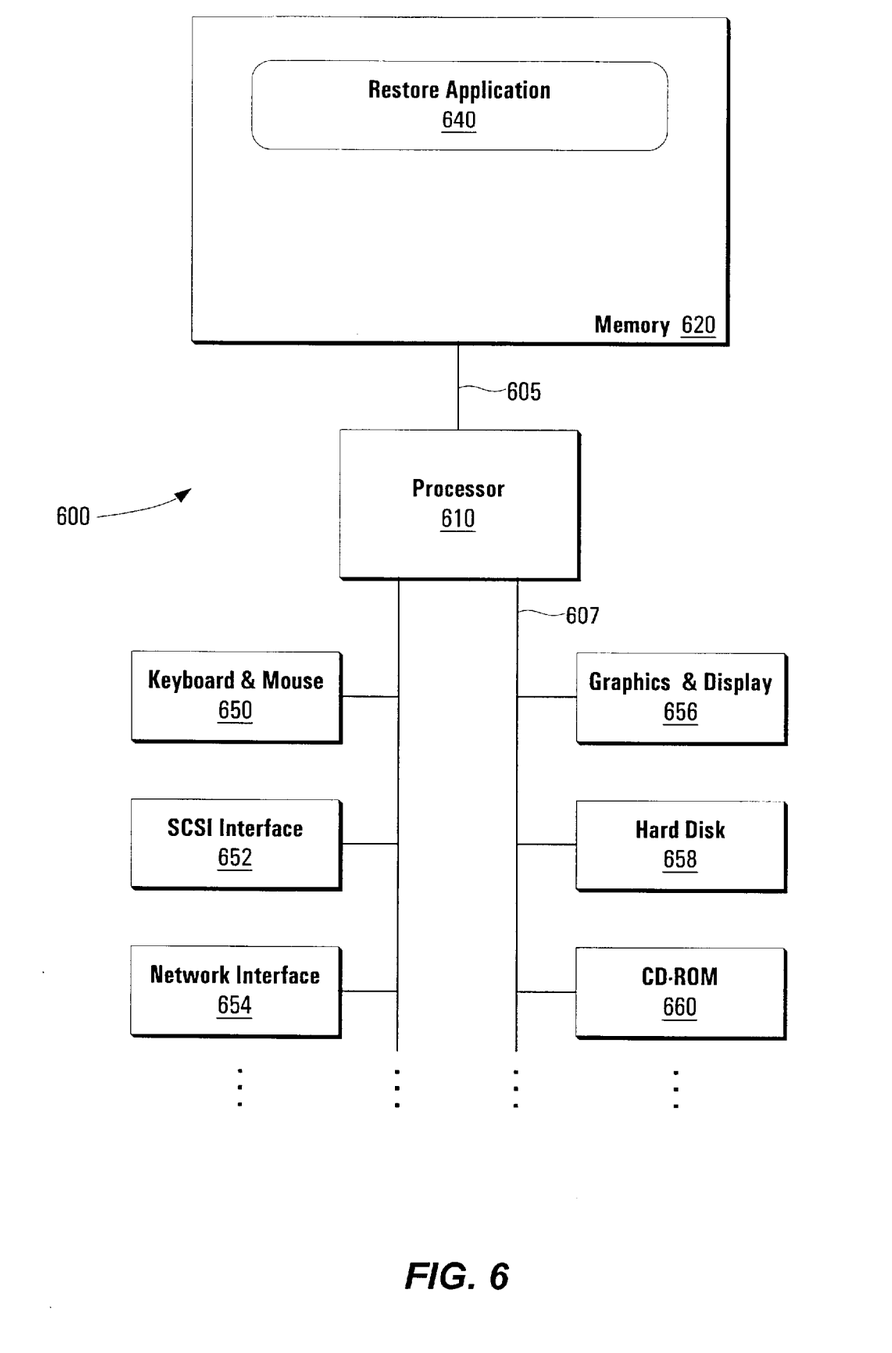
FIG. 6 is a simplified block diagram of a computer system for implementing the techniques of the present invention.

FIG. 1 illustrates a simplified example of an enterprise computing system 100. Servers 110 and 120 are at the heart of computing system 100. As members of enterprise computing system 100, servers 110 and 120 are often referred to as "hosts" or "nodes" and can execute an number of different types of programs including, for example, operating systems, file systems, volume managers, and applications programs such as database systems. FIG. 6 (described below) illustrates some of the features common to servers 110 and 120 as well as client computer systems 130. Servers 110 and 120 can exchange data over network 140, typically a local area network (LAN), e.g., an enterprise-wide intranet, or a wide area network (WAN) such as the Internet. Additionally, network 140 provides a communication path for various client computer systems 130 to communicate with servers 110 and 120.

Other elements of enterprise computer system 100 include storage area network (SAN) 150, SAN switch 160, and storage devices such as tape drive 170, storage array 180, and optical drive 190. As shown in FIG. 1, both servers 110 and 120 are coupled to SAN 150. SAN 150 is conventionally a high-speed network that allows the establishment of direct connections between storage devices 170, 180, and 190 and servers 110 and 120. Thus, SAN 150 is shared between the servers and allows for the sharing of storage devices between the servers to providing greater availability and reliability of storage.

SAN switch 160, tape drive 170, storage array 180, and optical drive 190 are examples of shared resources. The most common shared resource in an enterprise computing environment is some form of shared data resource, such as one or more disk drives. Although a disk device (and various related devices such as storage array 180) is perhaps the most common example of both a shared resource and a shared data resource, a variety of other types of devices will be well known to those having ordinary skill in the art. Moreover, servers 110 and 120 can be connected to SAN 150 through SAN switch 160. Additionally, the shared resources can be directly connected to or part of the servers, and thus enterprise computing system 100 need not include a SAN. Alternatively, servers 110 and 120 can be connected to multiple SANs. Additionally, SAN switch 160 can be replaced with a SAN router or a SAN hub.

Protecting the integrity of data as it is moved from one part of a computing system to another is an important aspect of any computer system. Data movement can result from a variety of operations including normal application software operation, data backup operations, data restore operations, and data relocation resulting from system design changes or hardware failures. In many computing systems, data movement is handled by programs executing on servers such as servers 110 and 120. In the case of data movement operations such as data backup and data restore, the use of server resources to handle the data movement means that fewer server resources are available for more typical operations such as application software and operating system overhead. Accordingly, efforts have been taken to move some I/O processing off of system servers to an offhost agent. Such agents are often referred to as third-party copy (3PC) devices or data movers.

Figure 2:
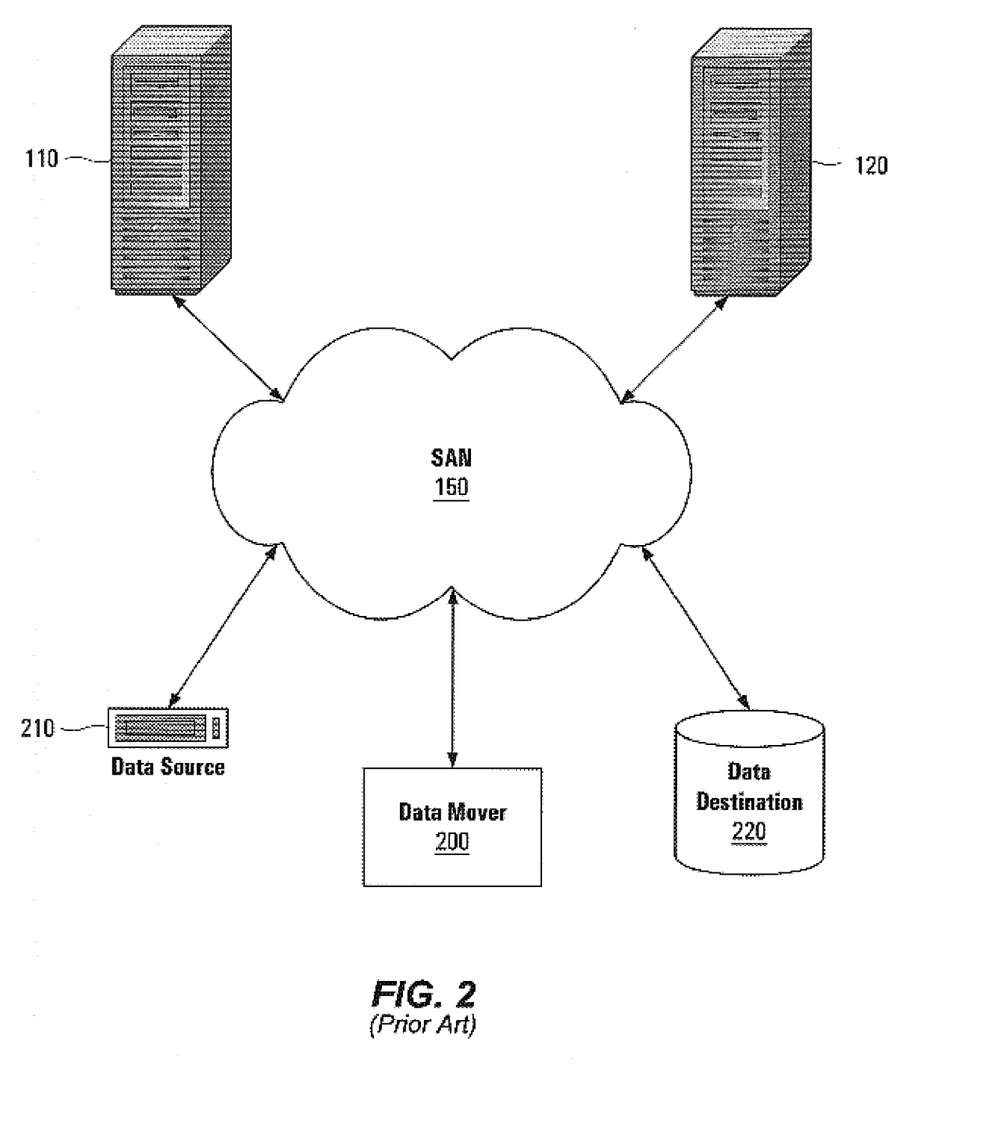
FIG. 2 illustrates the use of a data mover to move data from a source to a destination.

Third-party copy operations transfer data directly between storage devices in a SAN or other environment using a third-party copy device, copy manager, or data mover 200 such as illustrated in FIG. 2. Data mover 200 can be a separate device as shown; part of a SAN switch, router, bridge, or another SAN network component (not shown) or within a storage element such as storage array 180 in FIG. 1. As is typical of SAN environments, the connection between the servers 110 and 120 and data mover 200 is conventionally a channel protocol bus such as SCSI or fibre channel connected directly to the storage devices or storage device controllers (e.g. RAID controllers). Thus, the data mover operates on behalf of some other piece of software, e.g., a backup or restore application, to accomplish the third party copy operation.

In one example of a third party copy device, the device implements the SCSI-3 extended copy command. SCSI-3 commands are described *SCSI Primary Commands*—3 (SPC-3), Working Draft, Revision 03, T10, a Technical Committee of the Accredited Standards Committee of the National Committee for Information Technology Standards (NCITS), 10 Jan. 2002, which is hereby incorporated by reference herein in its entirety. The extended copy command provides a SCSI command to copy data from one set of devices to another. These devices can be disks, tapes, or other types of storage devices. The SCSI command can be used on devices connected via SCSI cables or Fibre Channel connections. In this example, a data mover that supports the SCSI-3 extended copy command receives and performs the extended copy command. In general, the data mover is an intelligent device somewhere in the storage infrastructure that understands the extended copy command. The data mover can be a server, but more likely will be a smart storage device, such as an intelligent tape device, disk device, SAN switch or storage router. The host server typically has some additional processing to perform at first, in order to gather all file or volume information necessary to pass along inside the extended copy command. Additionally, if either the source or destination of the extended copy is a removable media device, the host will typically first issue other SCSI commands to get the removable device into the proper position (loading or positioning the tape). Next, the host issues the extended copy command to the data mover, telling the device to move data from one storage device directly to another storage device. After issuing the extended copy command, no further instructions have to be issued by the host to move the data—the devices themselves perform the entire data movement operation over the SCSI bus or Fibre Channel connection.

As illustrated in FIG. 2, storage devices 210 and 220 are coupled to the SAN 150. In this example, storage devices 210 and 220 are shown as a data source and a data destination respectively (e.g., illustrating a restore operation from a tape drive to a hard disk), but such devices can typically operate as either data sources or data destinations. Alternately, source storage devices can be directly coupled to the SAN 150 through data mover 200. In still another example, data mover 200 can be included as part of a proprietary storage device, such as a storage array. Thus, data movers 200 can be implemented as independent devices, devices in traditional SAN components, or even as software executing on a SAN component, e.g., software executing on a storage device controller.

In general, data to and from storage devices is provided using either block-level or file-level access. File level access requires some knowledge of the underlying file system and/or volume management system used to organize data on the storage devices. This type of information is typically available only at the host level, and thus I/O operations utilizing file-level access must be performed or at least managed by software executing on a host computer. Block-level access uses physical storage device addresses to access data and thus need not be "assisted" by some entity having file system and/or volume knowledge. Third-part copy operations typically utilize block-level access because of the inherent speed and efficiency gained by avoiding heavy use of host resources.

Returning to the example illustrated in FIG. 2, third-party copy data transfers are initiated when an application operating on one of the servers provides the data mover 200 with the addresses of the source and destination devices and blocks. For example, a data restore application executing on server 110 can request that certain data on a tape in data source 210 be restored to a disk drive in data destination 220. Such address information is typically in the form of an extent list having one or more extents. An extent is typically a contiguous set of storage blocks allocated for a file portion, a file, or multiple files. Extents are typically represented by a device address indication, a starting block address on that device, and a length (number of contiguous blocks). However, extents can be defined in a variety of different ways, e.g., a starting address and an ending address, no device information explicitly included, etc. Thus, an extent is generally any information used to locate a desired portion of a storage resource.

For the purposes of this example, data destination 220 is a block (disk) device on which a file system or database resides and data source 210 can be any block or stream device (a serial device such as a tape drive). Once initiated, a third-party copy operation generally operates separately from any file system, volume management, or application program activity on the system servers. Thus, since the server can reorganize or write to data residing on data destination 220 asynchronously of the third-party copy operation, there is considerable risk in moving data into a live file system or database on the data destination. Potential error conditions can arise due to a reorganization and/or modification of the data destination device after an extent list initiated by a third-party copy request has been generated and sent to the data mover 200.

Figure 3A:
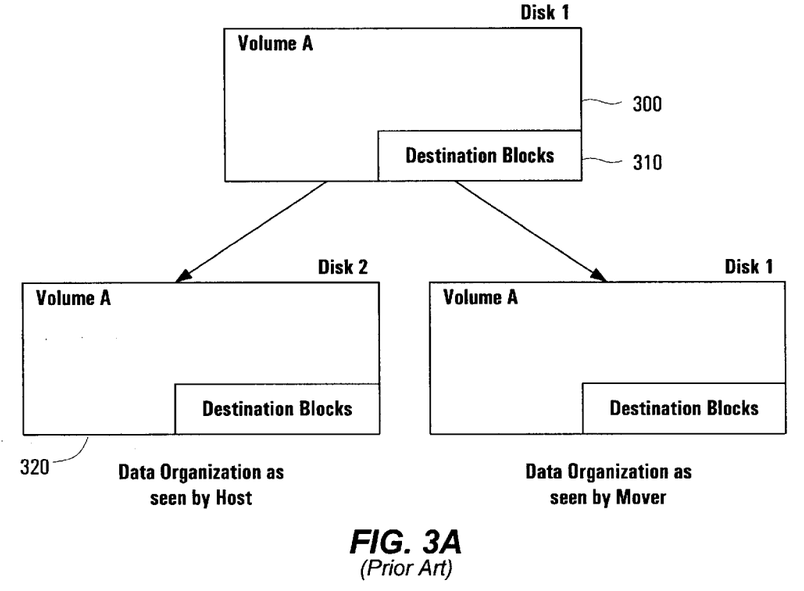
FIGS. 3A and 3B illustrate potential error conditions associated with extent based third-part copy operations.

The potential error conditions can be referred to as "sector slipping" events and manifest themselves as two error states on the data destination device. A first sector slipping error state involves a movement of data or allocated space from the destination extents to another physical location (e.g. volume reorganization). As illustrated in FIG. 3A, disk 1 300 is organized as volume A and includes destination blocks 310 corresponding to destination extents that are to be written to by a third-party copy operation. Some time after the list of data extents has been provided to the data mover, but before the third-party copy operation has completed, an error is detected on disk 1 300 causing a volume manager to move all data for volume A from disk 1 300 to disk 2 320. Since the third-party copy operation has not yet completed and the destination blocks 310 have moved, there exists the possibility that the destination blocks 310 moved from disk 1 to disk 2 will not reflect all the data intended to be copied by the third-party copy operation. Furthermore, the data mover has no way of knowing that the reorganization is taking place and continues to move blocks into the destination blocks 310 on disk 1.

Figure 3B:
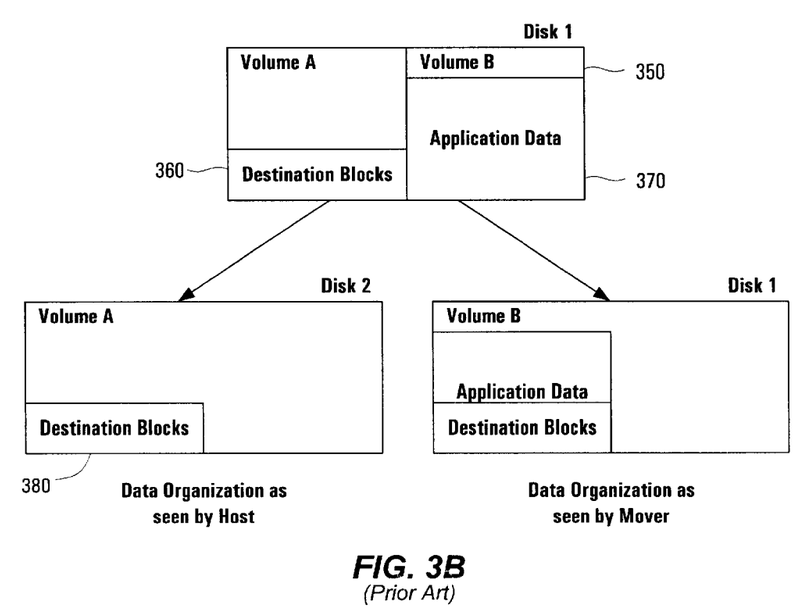

Another error state is illustrated in FIG. 3B. Disk 1 350 is partitioned into two volumes, volume A and volume B. Volume A includes destination blocks 360 corresponding to destination extents that are to be written to by a third-party copy operation. Volume B includes application data 370 that is, in general, unrelated to the data associated with destination blocks 360. Some time after the list of data extents has been provided to the data mover, but before the third-party copy operation has completed, the storage space on disk 1 is reallocated so that volume A is moved to disk 2 380 and volume B is reorganized on disk 1. The description of destination blocks 360 given to the data mover, e.g., the extent list, typically carries no information about the file or volume for which the blocks are currently storing data. Consequently, when a file system or volume manager relocates data from an original block to another block, a data mover given the original block as part of an extent list does not know about the relocation. In this example, the reorganization of volume B included movement of application data 370 to an area of disk 1 that includes destination blocks 360. Thus, as the data mover writes to destination blocks 360, it may be erroneously writing over valid application data.

Accordingly, it is desirable to provide safe and accurate data movement in third-party copy operations.

SUMMARY OF THE INVENTION

It has been discovered that systems, methods, apparatus and software can utilize an indirect write driver to prevent possible error conditions associated with using a third-party copy operation directed at a storage resource A data transport mechanism such as a data restore application initiates a third-party copy operation from a data source to a data cache. The indirect write driver monitors write commands as they pass to a storage resource driver. If a command is found to be an indirect write command, e.g., a command designed to complete the movement of data from the data cache to the storage resource, it is handled accordingly. Normal write commands are passed on to the storage resource driver. By completing the data move operation using normal storage management channels, e.g., the operating system, file system, and/or volume manager, error conditions can be avoided.

Accordingly, one aspect of the present invention provides a method. The method includes receiving a write command for a storage resource. Whether the write command for the storage resource is an indirect write command is determined. The write command for the storage resource is passed to a storage resource driver when the write command for the storage resource is not an indirect write command. A data move operation from a data cache to the storage resource is initiated when the write command for the storage resource is an indirect write command.

In another aspect of the present invention, a system includes an indirect write driver and a data transport module. The indirect write driver is configured to receive a write command for a storage resource, determine whether the write command for the storage resource is an indirect write command, and initiate a data move operation from a data cache to the storage resource when the write command for the storage resource is an indirect write command. The data transport module is configured to initiate a third-party copy operation, wherein the third-party copy operation moves data from a data source to the data cache.

In still another aspect of the present invention, an apparatus includes a receiving means, an examining means, and an initiating means. The receiving means is for receiving a write command for a storage resource. The examining means is for determining whether the write command for the storage resource is an indirect write command. The initiating means is for initiating a data move operation from a data cache to the storage resource when the write command for the storage resource is an indirect write command.

The foregoing is a summary and thus contains, by necessity, simplifications, generalizations and omissions of detail. Consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 4:
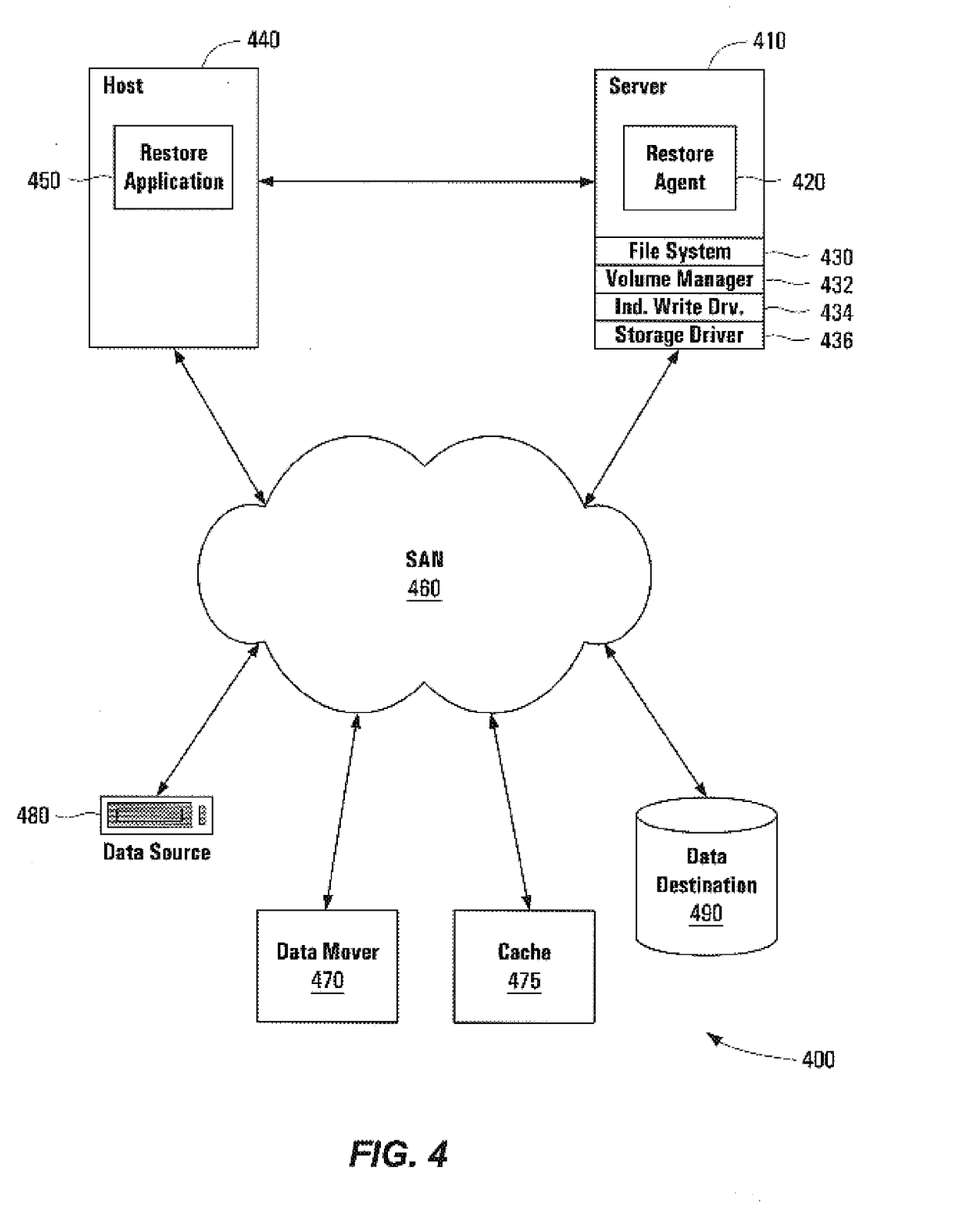
FIG. 4 is a simplified block diagram of a computer system using indirect write driver in the context of a third-party copy operation.

FIG. 4 is a simplified block diagram of a computer system using an indirect write driver in the context of a third-party copy operation. In general, computer system 400 can be part of a larger computer system such as enterprise computer system 100 of FIG. 1. Server 410 includes file system software 430, volume management software 432 indirect write driver software 434 and storage driver software 436 executing on the server. File system software provides and/or supports additional (beyond typical operating system file system capabilities) file system features including for example: quick-recovery, journaling, backup without data lock out, and online file system resizing. Volume manager software enables physical resources configured in the computer system to be managed as logical devices or volumes. Software such as 430 and 432 can be part of the operating system executing on server 410, or it can comprise one or more specialized components such as the VERITAS Volume Managerυ and VERITAS File System™ products provided by VERITAS Software Corporation.

As will be discussed in greater detail below, indirect write driver 434 intercepts storage resource modification commands, particularly write commands, from server 410's operating system or other software components such as file system 430 volume manager 432, or restore application 450. Since the one of these components, e.g., the file system, generates destination extents, error conditions are prevented while the transfer is in progress. In general, data modification includes both writing to a portion of the storage resource thereby changing the data values stored therein and moving the data to another physical location as might be required during a hardware failure or a disk defragmentation operation. In the example illustrated, indirect write driver 434 is located between system software components, e.g., those software components that typically request or manage requests for storage resource reads and writes, and a storage device driver. Alternately, indirect write driver 434 can be incorporated into one or more server software components such as file system 430, volume manager 432, or storage driver 436.

Software drivers are typically control programs, in many cases hardware-specific control programs, that enable a computer system to work with a particular device or devices, such as hardware devices including storage resources. Drivers often handle device-specific features, thereby freeing other software, e.g., the operating system, from the need to specifically understand and support the device. However, in the broadest sense of the term, a driver need not be associated with a particular hardware device or any hardware device. Thus a driver can simply be a control program designed to interface with one or more other programs.

In the examples of indirect write driver 434 and storage driver 436, commands for a storage device that would typically go straight to storage driver 436, are first intercepted and analyzed by indirect write driver 434. Examples of such commands include read and write commands directed to a particular storage resource. A further example of a write command is an indirect write or pseudo-write command. In general, these commands are related to some storage resource operation but may require some additional manipulation, redirection, or processing before they ultimately affect a write operation on a storage resource. In one example, an indirect write command can be described as a data-less write operation where the source of the data is expressed as a source location (e.g., a starting address and a length) and the destination for the data transfer is generated by the file system in response to the indirect write operation.

Server 410 utilizes storage resources including data source 480 and data destination 490. As illustrated in FIG. 4, data source 480 is a tape drive or tape drive library typically used for performing data backup and restore operations. Data destination 490 is typically one or more disk drives or disk drive arrays. Storage resources are coupled to server 410 through storage area network 460.

Host 440 executes a data transport application such as restore application 450. Host 440 is illustrated as a separate computer system, e.g., another server or a client computer system coupled to server 410 via a network such as a LAN or WAN. Restore application 450 communicates with server 410's file system, volume manager, and/or operating system via restore agent 420. Alternately, restore application 450 can communicate directly with file system, volume manager, and/or operating system components executing on server 410. Additionally, restore application 450 need not be executing on a separate computer system such as host 440, but can instead execute as one or more processes on server 410.

Data mover 470 is a device for performing third-party copy operations as previously described. Data mover 470 can be a separate device as shown; part of a SAN switch, router, bridge, or another SAN network component (not shown); part of a storage resource such as data destination 490; or a process executing on a controller or processor associated with any of these devices. Data cache 475 is a temporary storage cache used as an intermediate point in the transport of data from data source 470 to data destination 490. When used in conjunction with indirect write driver 434, data can be moved from data source 480 to data destination 490 using third-party copy operations while avoiding the previously described error conditions. Data cache 475 can be a separate device, part of data mover 470, or part of a storage resource such as data source 480 and data destination 490. Moreover, data cache 475 can be constructed using one or more types of memory including random access memories, flash memories, magnetic storage devices, and optical storage devices.

Although each of data source 480, data mover 470, data cache 475 and data destination 490 are all shown as coupled to server 410 and host 440 through SAN 480, it will be obvious to those having ordinary skill in the art that one, some, or all of the devices can be coupled directly to one or more of server 410 and host 440, and thus SAN 460 need not be utilized.

Figure 5:
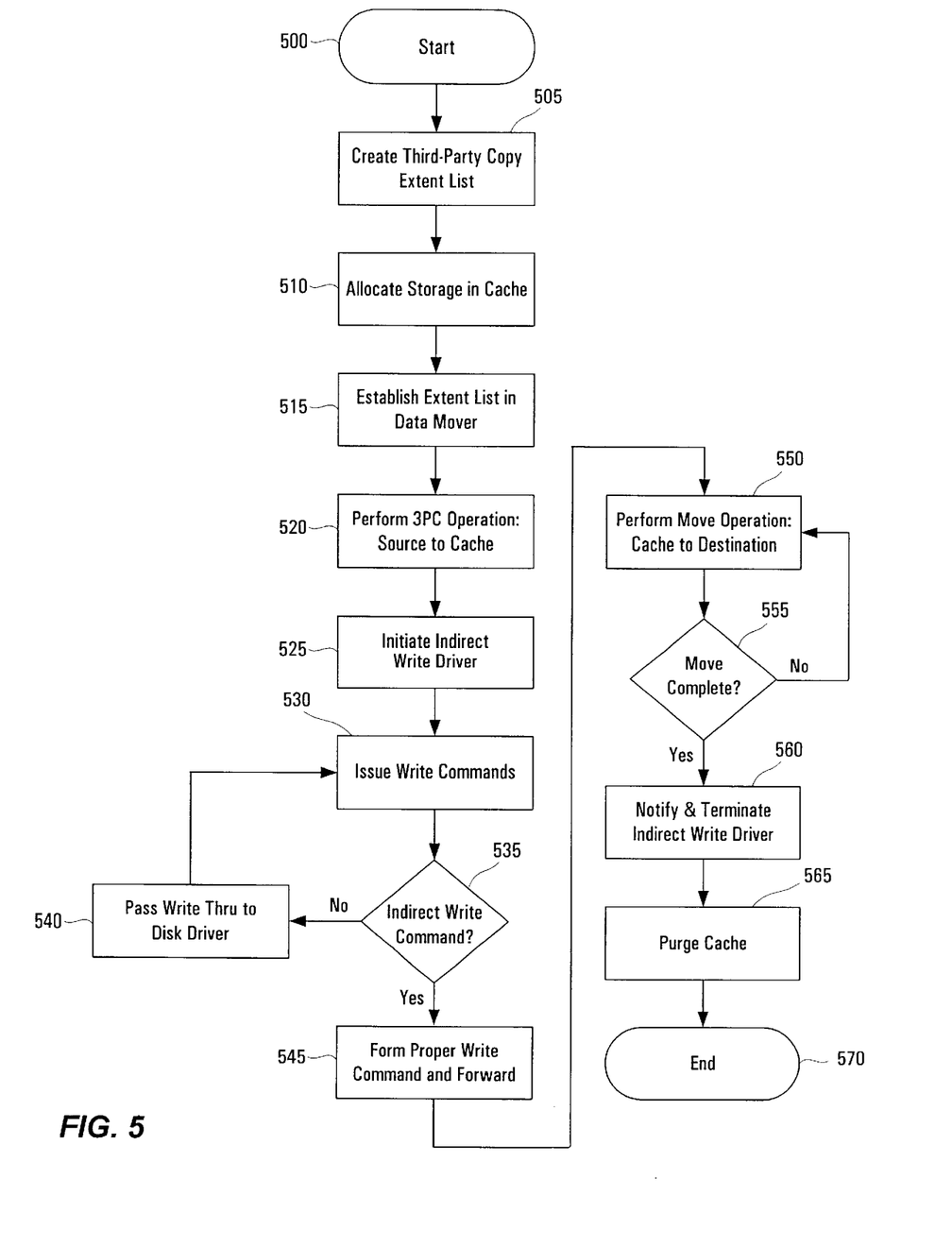
FIG. 5 is a flow chart illustrating techniques of the present invention.

Operation of systems and methods for providing safe third-party copy data movement are illustrated in FIG. 5. Operation begins 500 when some data transport mechanism such as restore application 450 is invoked. In the examples described below, a data restore application will be utilized, but those having ordinary skill in the art will readily recognize that a variety of data transport applications can utilize both third-party copy operations and the protection schemes described in the present application. A third-party copy extent list is created (e.g., a "source" extent list) as shown in step 505. For example, if a user of computer system 400 wishes to restore a data file from a tape in data source 480 to a disk drive in data destination 490, an extent list will be created describing the data to be restored. Next, space is allocated in the data cache, as shown in step 510, for movement of data from the data source to the data cache. To allocate space in the data cache, the restore application might send information to the cache about the amount of data to be moved from the data source to the data cache or to the data destination. In response, the data cache could return a "destination" extent list or some other indication representing the allocated portion of the cache. In other embodiments, some predefined portion of the cache may be allocated regardless of the amount of data to be moved from the data source.

Step 515 illustrates the establishment of the source and/or destination extent lists in the data mover. Note that in an example where the data mover includes the data cache, a separate step of establishing the destination extent list might not be necessary because the act of allocating storage space in the cache might itself provide the data mover with the destination information needed. Typically, these extent lists provide the data mover with the information necessary to find the source data and write the destination data. Once an extent list is received, the data mover may send an acknowledgement message back to the device or process that sent the extent list. This message serves to notify the sender that the extent list was successfully received and that a third-party copy operation can be initiated. In some examples, the acknowledgement message can include an identifier describing the cache transfer session.

A third-party copy operation to move data from the data source to the data cache is performed at 520. Either before the third-party copy operation from the data source to the data cache is started, while it is occurring, or as illustrated, after it has completed, the indirect write driver is initiated (525). In one example, the indirect write driver is a dynamically loadable driver, and thus initiating the driver begins with loading the driver. Other examples of techniques for initiating a driver will be well known to those having ordinary skill in the art.

Once initiated, commands that might cause modification to the data destination pass through the indirect write driver before they are handled by a storage resource driver for the data destination. Such commands typically come from system software that manages access to the storage resources, e.g., the operating system, file system, volume manager, or the like. Moreover, these commands may be the result of some other application requesting access to the storage resource.

In step 535, the commands passing through the indirect write driver are examined. If they are not indirect write commands, i.e., if they are commands that are not designed to be trapped by the indirect write driver, they are passed on to the storage driver at 540. If a command is found to be an indirect write command, operation transitions to 545. In general, indirect write commands are commands that can be processed normally by the operating system, file system, and/or volume manager but contain some information used to complete the data move from the data source to the data destination. For example, an indirect write command might include a location in the data cache or extent list referring to the data cache instead of actual data or a reference to the typical buffer in which data to be written to a storage resource would normally reside. Indirect write commands can originate from or be caused by the restore application as part of its attempt restore data from the data source to the data destination.

A variety of different aspects of commands passing through the indirect write driver can be examined in order to determine if the command is an indirect write command. For example, if the write command includes data source location information, that information can be used to determine if the command is an indirect write command or some other type of write command. Such data source location information might distinguish between, for example, a data cache such as cache 475 and a buffer used as part of a normal write operation. In another example, the absence of source data or source data location information might itself be an indication that the command is an indirect write command. In still another example, a specific indication, such as a flag, is used to distinguish indirect write commands from other write commands.

The indirect write driver identifies the relevant data cache information and causes movement (550) of the specified data from the data cache to the data destination. This movement can be accomplished in a variety of ways. In one example, the indirect write driver forms regular commands that are passed to the disk driver to read data from the data cache and write the data to the data destination, thereby completing the data move. In another example, the indirect write driver initiates another third-party copy operation to move the data from the data cache to the data destination. As noted above, initiating such an operation can include sending one or more extent lists to a data mover and requesting the data mover to perform the operation. However, since the commands initially passed through the normal storage management processes (e.g., the operating system, files system, and/or the volume manager) their space in the data destination is already allocated and the aforementioned possible error conditions are avoided.

Once the data move is complete, as determined in step 555, any software that needs to be notified is notified in step 560 and the indirect write driver can be terminated, e.g., unloaded. Examples of software that might need to be notified include a restore application, the file system, and the indirect write driver itself. Once the move is complete, the data stored in the data cache need not be maintained, and the cache is purged in step 565. The process then terminates 570.

The flow charts of FIG. 5 illustrate some of the many operational examples of a third-part copy data protection scheme. Those having ordinary skill in the art will readily recognize that certain steps illustrated in FIG. 5 can be eliminated or taken in an alternate order. Moreover, the methods described in FIG. 5 are typically implemented as one or more software programs for a computer system, that is encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

FIG. 6 illustrates a block diagram of a computer system 600 for implementing the techniques of the present invention. For example, computer system 600 can be an embodiment of one of the previously described servers, clients or hosts. Computer system 600 includes a processor 610 and a memory 620 coupled together by communications bus 605. Processor 610 can be a single processor or a number of individual processors working together. Memory 620 is typically random access memory (RAM), or some other dynamic storage device, and is capable of storing instructions to be executed by the processor, e.g., restore application 640 and indirect write driver software (not shown). Memory 620 is also used for storing temporary variables or other intermediate information during the execution of instructions by the processor 610.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Additionally, software 640 can be provided to the computer system via a variety of computer readable media including electronic media (e.g., flash memory), magnetic storage media (e.g., hard disk 658, a floppy disk, etc.), optical storage media (e.g., CD-ROM 660), and communications media conveying signals encoding the instructions (e.g., via a network coupled to network interface 654).

Computer system 600 also includes devices such as keyboard & mouse 650, SCSI interface 652, network interface 654, graphics & display 656, hard disk 658, and CD-ROM 660, all of which are coupled to processor 610 by communications bus 607. It will be apparent to those having ordinary skill in the art that computer system 600 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:

receiving a write command for a storage resource;

determining whether the write command for the storage resource is an indirect write command;

passing the write command for the storage resource to a storage resource driver when the write command for the storage resource is not an indirect write command; and initiating a data move operation from a data cache to the storage resource when the write command for the storage resource is an indirect write command.

2. The method of claim 1 wherein the initiating a data move operation further comprises:

providing at least one command to the storage resource driver, the at least one command including a write command for writing data from the data cache to the storage resource.

3. The method of claim 1 wherein the initiating a data move operation further comprises:

initiating a third-party copy operation, wherein the third-party copy operation moves data from the data cache to the storage resource.

4. The method of claim 3 further comprising:

determining an extent list, including at least one extent describing a portion of the storage resource, from the indirect write command; and sending the extent list to a data mover operable to perform the third-party copy operation.

5. The method of claim 1 further comprising:

deriving an extent list including at least one extent describing a portion of the data cache;

sending the extent list to a data mover operable to perform a third-party copy operation; and initiating the third-party copy operation, wherein the third-party copy operation moves data from a data source to the portion of the data cache.

6. The method of claim 5 further comprising:

initiating operation of an indirect-write driver, the indirect-write driver executing on a computer system and performing at least one of the receiving a write command, the determining whether the write command for the storage resource is an indirect write command, the passing the write command, and the initiating a data move operation.

7. The method of claim 5 further comprising:
allocating the portion of the data cache for use by the third-party copy operation.

8. The method of claim 5 further comprising:
sending an indirect write command, the indirect write command including the extent list including at least one extent describing the portion of the data cache.

9. The method of claim 1 wherein the determining further comprises:
examining a location indication for data to be written by the write command for the storage resource; and
determining whether the location indication for data to be written by the write command for the storage resource refers to the data cache.

10. The method of claim 1 encoded in a computer readable medium as instructions executable on a processor, the computer readable medium being one of an electronic storage medium, a magnetic storage medium, an optical storage medium, and a communications medium conveying signals encoding the instructions.

11. A system comprising:
an indirect write driver configured to:
receive a write command for a storage resource;
determine whether the write command for the storage resource is an indirect write command; and
initiate a data move operation from a data cache to the storage resource when the write command for the storage resource is an indirect write command; and
a data transport module configured to:
initiate a third-party copy operation, wherein the third-party copy operation moves data from a data source to the data cache.

12. The system of claim 11 further comprising:
a data mover in communication with the data transport module and configured to perform the third-party copy operation.

13. The system of claim 12 wherein the data move operation from the data cache to the storage resource is a second third-party copy operation, and wherein the data mover is further configured to perform the second third-party copy operation.

14. The system of claim 12 wherein the data mover is further configured to send an indication that the third-party copy operation is complete to the data transport module.

15. The system of claim 11 further comprising a storage resource driver, wherein the data move operation from the data cache to the storage resource provides at least one command to the storage resource driver, the at least one command including a write command for writing data from the data cache to the storage resource.

16. The system of claim 11 wherein the data transport module is a data restore application.

17. The system of claim 11 wherein the indirect write driver is further configured to:
determine an extent list, including at least one extent describing a portion of the storage resource, from the indirect write command; and
send the extent list to a data mover operable to perform the data move operation from the data cache to the storage resource as a second third-party copy operation.

18. The system of claim 11 wherein the data transport module is further configured to:
determine an extent list including at least one extent describing a portion of the data cache; and
send the extent list to a data mover operable to perform the third-party copy operation.

19. The system of claim 11 wherein the write command includes a location indication for data to be written by the write command, and wherein the indirect write driver is further configured to:
examine the location indication; and
determine whether the location indication refers to the data cache.

20. The system of claim 11 wherein the transport module is configured to send the indirect write command to the indirect write driver, the indirect write command including an extent list including at least one extent describing a portion of the data cache.

21. The system of claim 11 further comprising:
a computer system including:
a first processor; and
a first memory coupled to the first processor;
wherein the data transport module and the indirect write driver are encoded as instructions stored in the first memory and executable on the first processor.

22. The system of claim 21 further comprising:
a network coupling the first computer system, the storage resource, the data cache, and the data mover to each other.

23. The system of claim 21 further comprising:
a first computer system including:
a first processor; and
a first memory coupled to the first processor;
a second computer system including:
a second processor; and
a second memory coupled to the second processor; and
a network coupling the first computer system to the second computer system;
wherein the data transport module is encoded as instructions stored in the first memory and executable on the first processor, and the indirect write driver is encoded as instructions stored in the second memory and executable on the second processor.

24. An apparatus comprising:
a receiving means for receiving a write command for a storage resource;
an examining means for determining whether the write command for the storage resource is an indirect write command;
an initiating means for initiating a data move operation from a data cache to the storage resource when the write command for the storage resource is an indirect write command;
and
a data transport means for initiating a third-party copy operation, wherein the third-party copy operation moves data from a data source to the data cache.

25. The apparatus of claim 24 further comprising:
a determining means for determining an extent list including at least one extent describing a portion of the data cache; and
a sending means for sending the extent list to a data mover operable to perform the third-party copy operation.

* * * * *